United States Patent
Giesenberg et al.

[11] Patent Number: 5,889,226
[45] Date of Patent: Mar. 30, 1999

[54] LOCKING ASSEMBLY IN A LAUNCHER FOR MISSILES

[75] Inventors: Peter Giesenberg, Salem; Rolf Stadler, Überlingen, both of Germany

[73] Assignee: Bodenseewerk Gerätetechnik GmbH, Überlingen and Bodensee, Germany

[21] Appl. No.: 967,623

[22] Filed: Nov. 12, 1997

[30] Foreign Application Priority Data

Nov. 14, 1996 [DE] Germany ................... 196 48 609.2

[51] Int. Cl.⁶ ................................................ F41F 3/04
[52] U.S. Cl. ................................... 89/1.812; 89/1.806
[58] Field of Search .................... 89/1.812, 1.806, 89/1.807, 1.819, 1.53, 1.58, 1.59

[56] References Cited

U.S. PATENT DOCUMENTS

| | | | |
|---|---|---|---|
| 3,040,629 | 6/1962 | Duncan et al. | 89/1.806 |
| 3,166,981 | 1/1965 | Harris et al. | 89/1.7 |
| 4,519,291 | 5/1985 | Seeger et al. | 89/1.806 |
| 4,870,885 | 10/1989 | Grosselin et al. | 89/1.806 |
| 5,291,820 | 3/1994 | Hainsworth et al. | 89/1.812 |
| 5,533,433 | 7/1996 | Giesenberg et al. | 89/1.812 |

FOREIGN PATENT DOCUMENTS 3301567  2/1984  Germany.

*Primary Examiner*—Harold J. Tudor
*Assistant Examiner*—Theresa M. Wesson
*Attorney, Agent, or Firm*—Mallinckrodt & Mallinckrodt

[57] ABSTRACT

A locking assembly in a launcher for missiles comprises a pivotally mounted blocking latch which is provided with two blocking lugs for extending over a shoe provided on the missile. The blocking latch is biased by a spring toward a blocking position, in which the shoe of the missile is retained by the blocking lugs. A locking lug is provided on the blocking latch. In the blocking position the locking lug engages a safety lever having a contact surface, when inertial forces of the missile act on the blocking latch such that the blocking latch is retained in the blocking position, in which the blocking lugs extend over the shoe of the missile. The safety lever is pivotable about a pivot axis out of the pivotal path of the locking lug. The safety lever comprises means for reducing the distance between the contact surface and the pivot axis during the pivotal movement of the safety lever, such that the contact surface is removed from the locking lug during the pivotal movement.

2 Claims, 4 Drawing Sheets

LOCKING ASSEMBLY IN A LAUNCHER FOR MISSILES

BACKGROUND OF THE INVENTION

This invention relates to locking assembly in a launcher for missiles, comprising: a pivotally mounted blocking latch which is provided with two blocking lugs for extending over a shoe provided on the missile; a spring, by which the blocking latch is biased toward a blocking position, in which the shoe of the missile is retained by the blocking lugs; a locking lug provided on the blocking latch; a safety lever having a contact surface which is engaged by the locking lug in the blocking position when acceleration forces of the missile act on the blocking latch, such that said blocking latch is retained in the blocking position, in which the blocking lugs extend over the shoe of the missile; and means for pivoting the safety lever about a pivot axis out of the pivotal path of the locking lug, which enables the blocking latch to pivot against the action of the spring into a release position, in which the blocking latch releases the shoe of the missile.

DESCRIPTION OF THE PRIOR ART

Missiles, in particular target tracking rockets, are held in launchers, which are attached to an aircraft. In these launchers they are retained by blocking latches against unintentional sliding-out. These blocking latches extend over a shoe, which is provided at the missile. The shoe is held in its locking position by a spring, for example a leaf spring package. Furthermore, the blocking latch is supported with a locking lug on a safety lever. When the missile is fired, the safety lever is pushed out of the path of the locking lug by an electro-mechanical device. Then the blocking latch is held in its blocking position only by the spring. The thrust of the power unit of the missile overcomes the force of the spring and pushes the blocking latch aside, such that the missile is released and can leave the launcher.

GB-A-2,133,865 shows such an arrangement, in which the blocking latch is a toggle lever mechanism having a joint. The joint engages a stop, which prevents the toggle lever mechanism from being deflected. In order to release the blocking latch the stop is removed by an electro-mechanical device. Then the toggle lever mechanism is deflected and does not block the locking lug anymore. In this known arrangement the toggle lever mechanism serves to delay the release of the missile relative to the time of the firing of the rocket motor by a predetermined time depending on the environmental conditions.

In common locking assemblies of the present type, a safety lever engaged by the locking lug is just pivotable about a pivot axis. In order to release the blocking latch the safety lever is pivotable out of the path of the locking lug.

An example of such a locking assembly is shown in WO-A94/03364 and in U.S. Pat. No. 5,533,433.

Therein, in the normal operating position, a rigid safety lever pivotally mounted about a pivot axis is located with its front end serving as contact surface in front of the locking lug. The safety lever serves to prevent the missile from sliding-out of the launcher due to strong inertial forces.

Now it has been found, that this mechanism occasionally fails to function.

SUMMARY OF THE INVENTION

The object of the present invention is to improve the reliability of the release of the locking lug by the pivotal safety lever in a locking assembly of the type mentioned above.

This object is achieved in that the safety lever comprises means for reducing the distance between the contact surface and the pivot axis during the pivotal movement of the safety lever, such that the contact surface is removed from the locking lug during the pivotal movement.

The invention is based on an investigation of the causes of the malfunction. It has been found, that the malfunction is based on strong frictional forces, which sometimes are acting bewteen the locking lug and the contact surface of the safety lever due to inertial forces, which are exerted by the missile on the blocking latch. This frictional forces are so strong, that the electro-mechanical releasing device cannot pivot the safety lever. Furthermore, it has been found, that these problems can be solved in that the contact surface of the safety lever is slightly removed when the pivotal movement of the safety lever starts, such that the contact surface gets off the locking lug. Then the safety lever can be pivoted out of the path of the locking lug without problems.

This solution permits the basic construction of the locking assembly having pivotable safety lever as it is widely used to be maintained. Therefore, conversion is easily possible and can be done within the available space.

The invention can be realised in that: the safety lever comprises a first link and a second link; the first link is located adjacent to the locking lug and comprises the contact surface; the second link is located remote from the locking lug and is pivotally mounted about the pivot axis; the first link and the second link are interconnected by a joint; the links, in an operating position, engage each other through first stop means, which prevent the safety lever from being deflected in a first direction under the action of longitudinal forces, such that the safety lever acts as a rigid structure; the deflecting movement of the links is limited to a finite angle in a second direction by second stop means; and the means for pivoting the safety lever act on the second link.

An embodiment of the invention is described in greater detail hereinbelow with reference to the accompanying drawings.

DESCRIPTION OF THE PREFERRED EMBODIMENT

Figure 1:
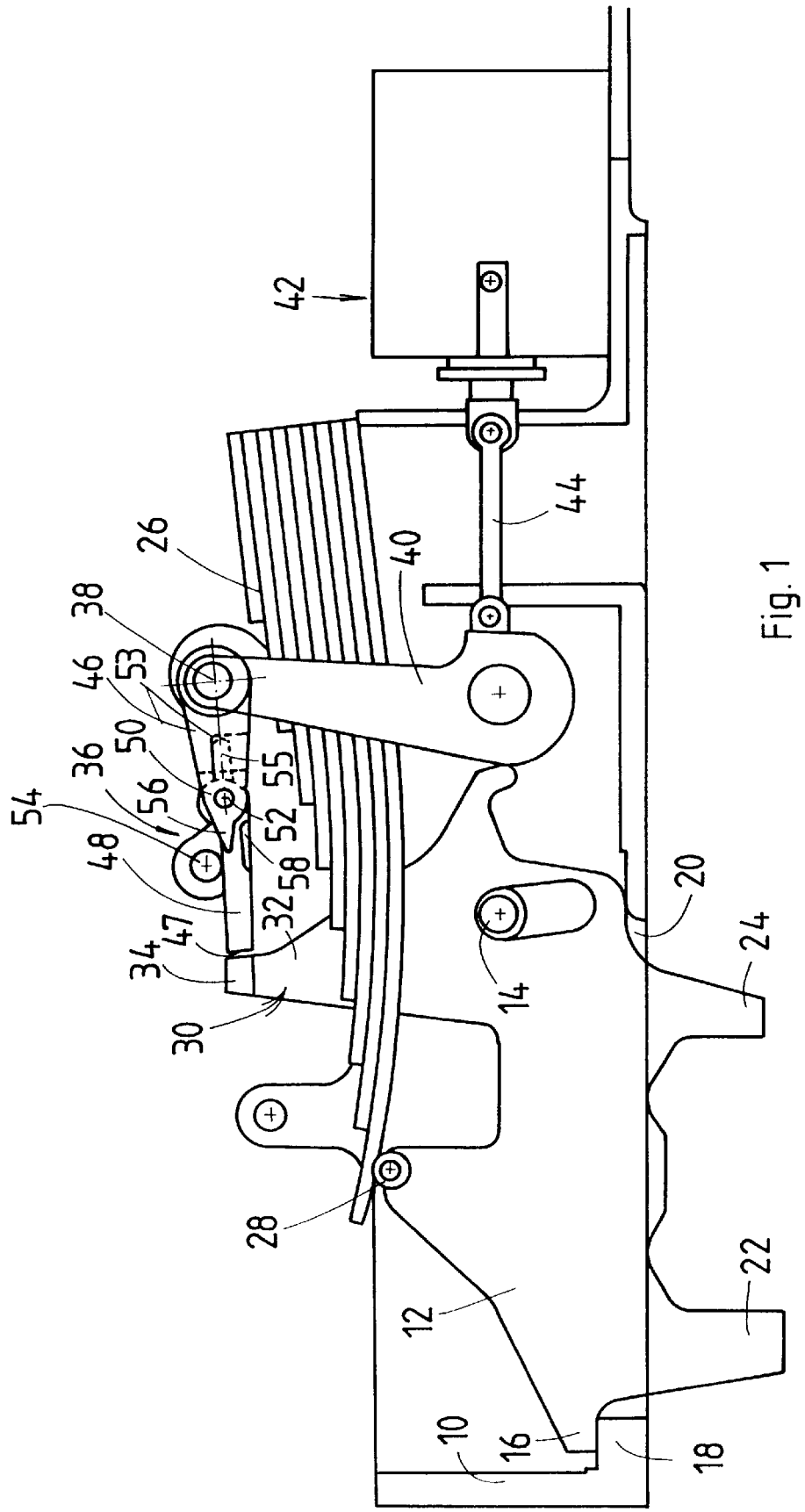
FIG. 1 shows a locking assembly in its operating position, in which the blocking latch locks the missile and the blocking latch is secured by the safety lever in this position.

Referring now to FIG. 1, there is shown a housing 10 of a locking assembly. A blocking latch 12 is located in the housing 10. The blocking latch 12 is pivotally mounted about a pin 14 located in the housing 10. The pin 14 extends through an elongated hole provided in the blocking latch 12. The blocking latch 12 engages with a lug 16 an edge 18 at the housing 10. Th e edge limits an aperture 20 in the bottom of the housing 10. Two blocking lugs 22 and 24 extend into this aperture. In operation the two blocking lugs 22 and 24 extend over a shoe provided on the missile and prevent the missile from sliding out of the launcher. A spring in the form of a leaf spring package urges against a pin 28 on the blocking latch 12.

The blocking latch 12 engages the pin 14 and the edge 18. The pin 28 is arranged at the upper part of the blocking latch 12 between the pin 14 and the edge 18. Therefore, the spring urges the blocking latch into the blocking position illustrated in FIG. 1, in which the blocking lugs extend over the shoe of the missile.

Furthermore, a locking lug 30 is integral with the blocking latch 12. The locking lug is T-shaped and has a central portion 32 and a transverse portion 34. A safety lever 36 extends in front of the transverse portion 34. The safety lever 36 is pivotally mounted about a pivot axis 38. A pivot lever 40 is rigidly connected to the safety lever 36. An electromechanical servomotor 42 acts on the pivot lever 40 through a link 44. The safety lever 36 forms a contact surface 46, which is engaged by the locking lug 30 with the transverse portion 34, when inertial forces of the missile, through the blocking lug 22, tend to pivot the blocking latch 12 clockwise thereby overcoming the force of the spring 26.

Figure 3:
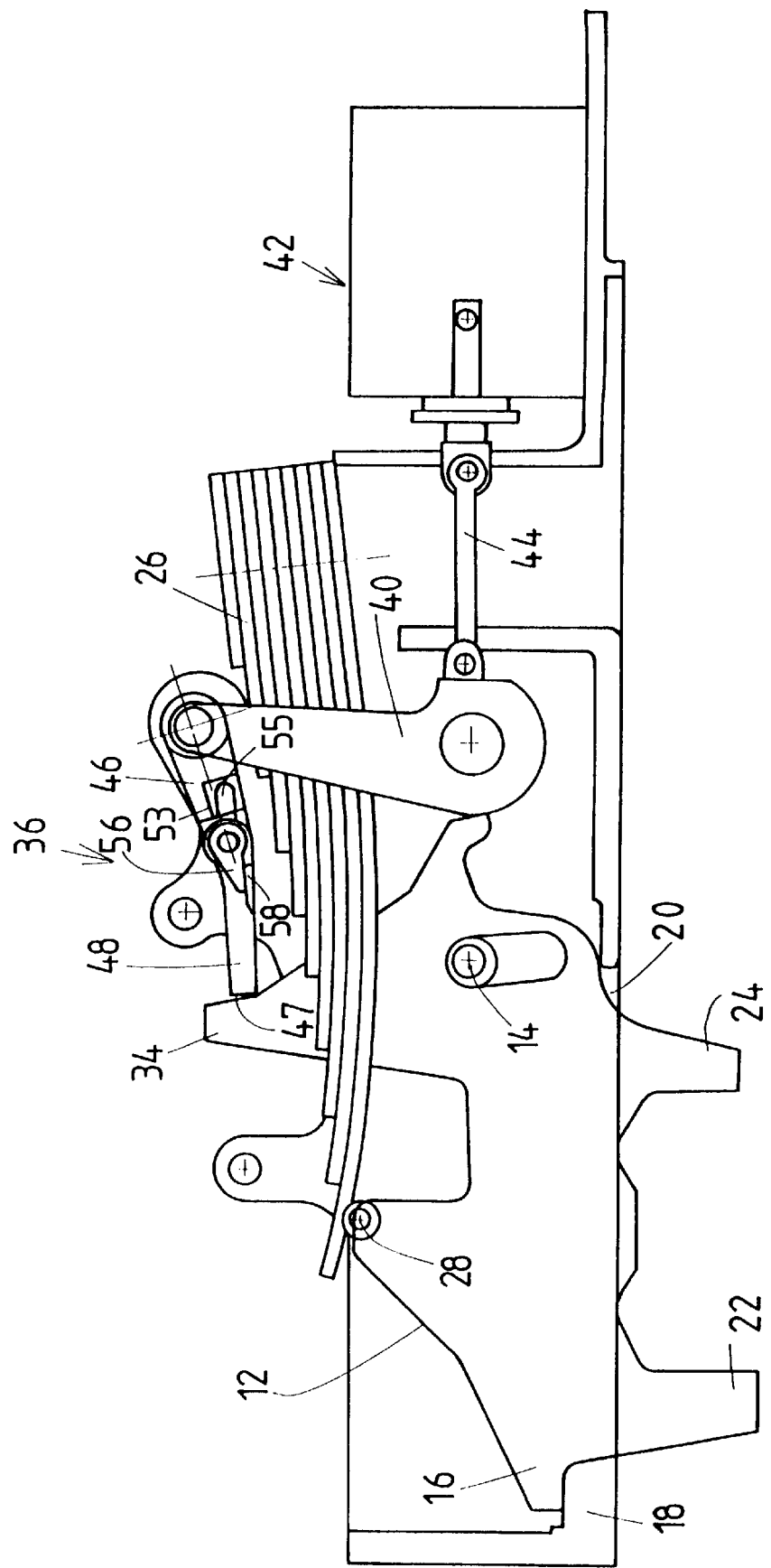
FIG. 3 shows the locking assembly of FIGS. 1 and 2 in an end position, in which the safety lever is pivoted out of the path of the locking lug.

The servomotor 42 is arranged to pivot the pivot lever 40 and thus the safety lever 36 counter-clockwise in FIG. 1. Thus, the safety lever 36 can, as illustrated in FIG. 3, be moved clockwise out of the path of the locking lug 30. Then the blocking of the blocking latch is released. When the power unit of the missile is fired, the thrust of the power unit acting on the blocking lug 22 pushes the blocking latch 12 away. The blocking latch 12 pivots clockwise about the pin 14 against the action of the spring overcome by the thrust. Thus, the missile is released.

Due to the inertial forces exerted by the missile on the blocking lug 22, very strong forces can act at the contact surface 46 between the locking lug 30 and the safety lever 36. These forces result in correspondingly strong frictional forces. The electro-mechanical servomotor 42 cannot always overcome these frictional forces. Then the blocking latch 12 and thus the missile remains blocked. This can lead to dangerous situations.

This danger is avoided by the illustrated construction of the safety lever 36.

The safety lever 36 consists of two links 46 and 48. The link 46, which is located remote from the locking lug 30, is rotatable about the pivot axis 38 and rigidly connected to the pivot lever 40. The link 48 adjacent to the locking lug 30 is pivotally mounted about an axis on the link 46 by means of a joint 50. The link 46 forms the contact surface 47 on the side of the locking lug. In the position illustrated in FIG. 1 the two links 46 and 48 are substantially aligned. Deflection of the system formed by the two links 46 and 48 upward under the action of the force exerted by the locking lug in the longitudinal direction is prevented by a stop 53, which is engaged by one arm 55 of the link 48 when the two links 46 and 48 are in a substantially straight position.

Figure 2:
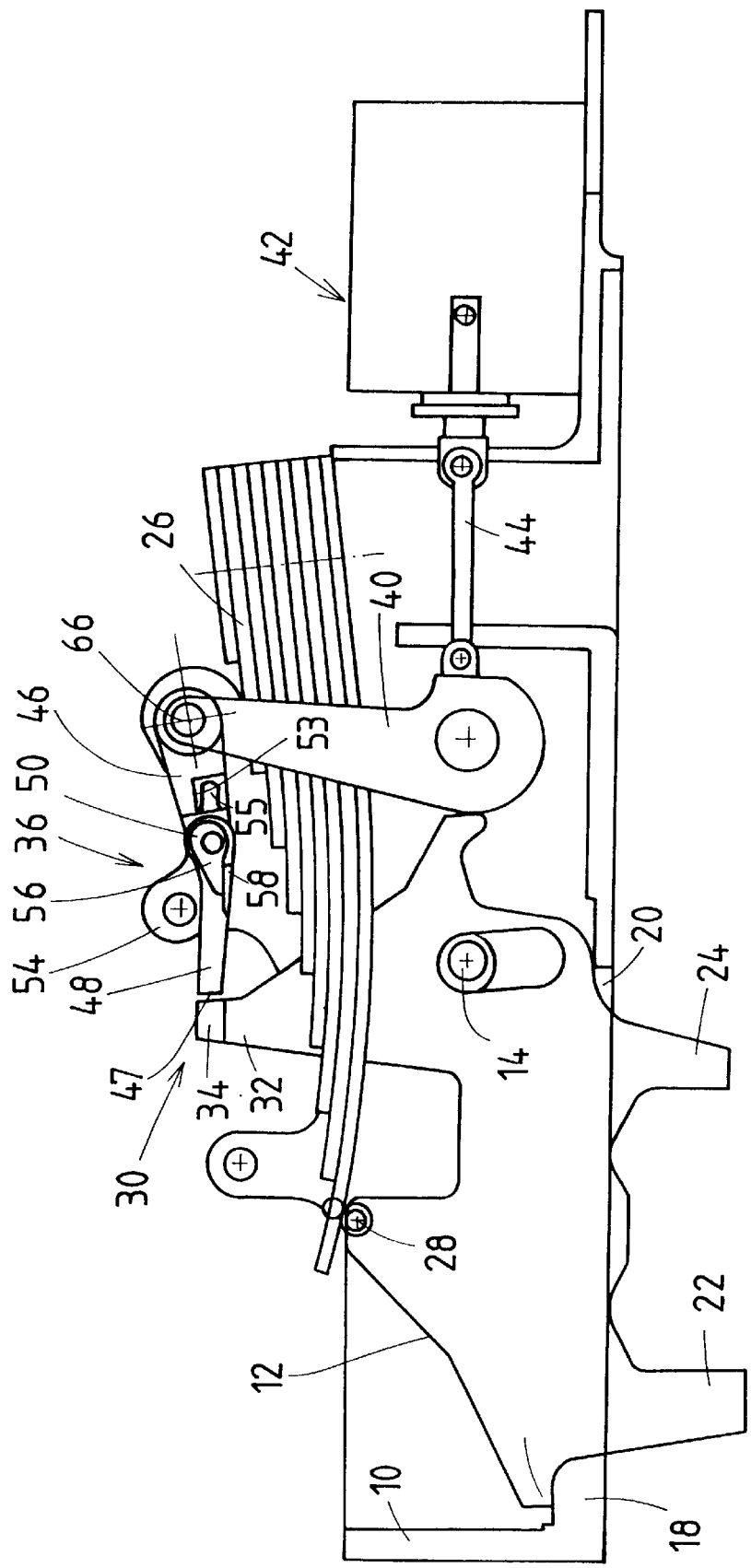
FIG. 2 shows the locking assembly of FIG. 1 in an intermediate position, in which the safety lever, at the beginning of the pivotal movement, is deflected to the stop means, such that the contact surface is removed from the locking lug.

The total safety lever 36 engages a structure-fixed stop 54, which limits the pivotal movement of the total safety lever 36 upwards in FIGS. 1 to 3.

In this position the locking lug 30 sometimes strongly engages the contact surface.

In order to release the missile, the pivot lever 40 is pulled to the right in FIG. 1 by the servomotor 42 and the pivot lever 40 is pivoted counter-clockwise.

As can be seen from FIG. 2, the safety lever 36 with the two links 46 and 48 is then deflected downwards in FIGS.

1 and 2. The link 46 is pivoted counter-clockwise and, thus, the link 48 is pivoted clockwise. Then, when a pivoting angle of 6° is reached, a stop boss 46 engages the link 46 at a counterstop 58 of the link 48.

This deflecting movement reduces the effective length of the safety lever 36. The contact surface 46 is removed or moved away from the locking lug 30. Thereby, the frictional force is not present anymore. When the safety lever 36 is pivoted further to a pivoting angle of 12°, as illustrated in FIG. 3, the link 48 follows the link 46 through the joint 50 and the stop boss 56. The contact surface 46 is moved relatively to the transverse portion 34 of the locking lug 30 downwards in FIG. 3 and, thus, the locking lug 30 is released. This is substantially effected without friction. Thus, the safety lever 36 cannot be blocked due to frictional forces.

Figure 4:
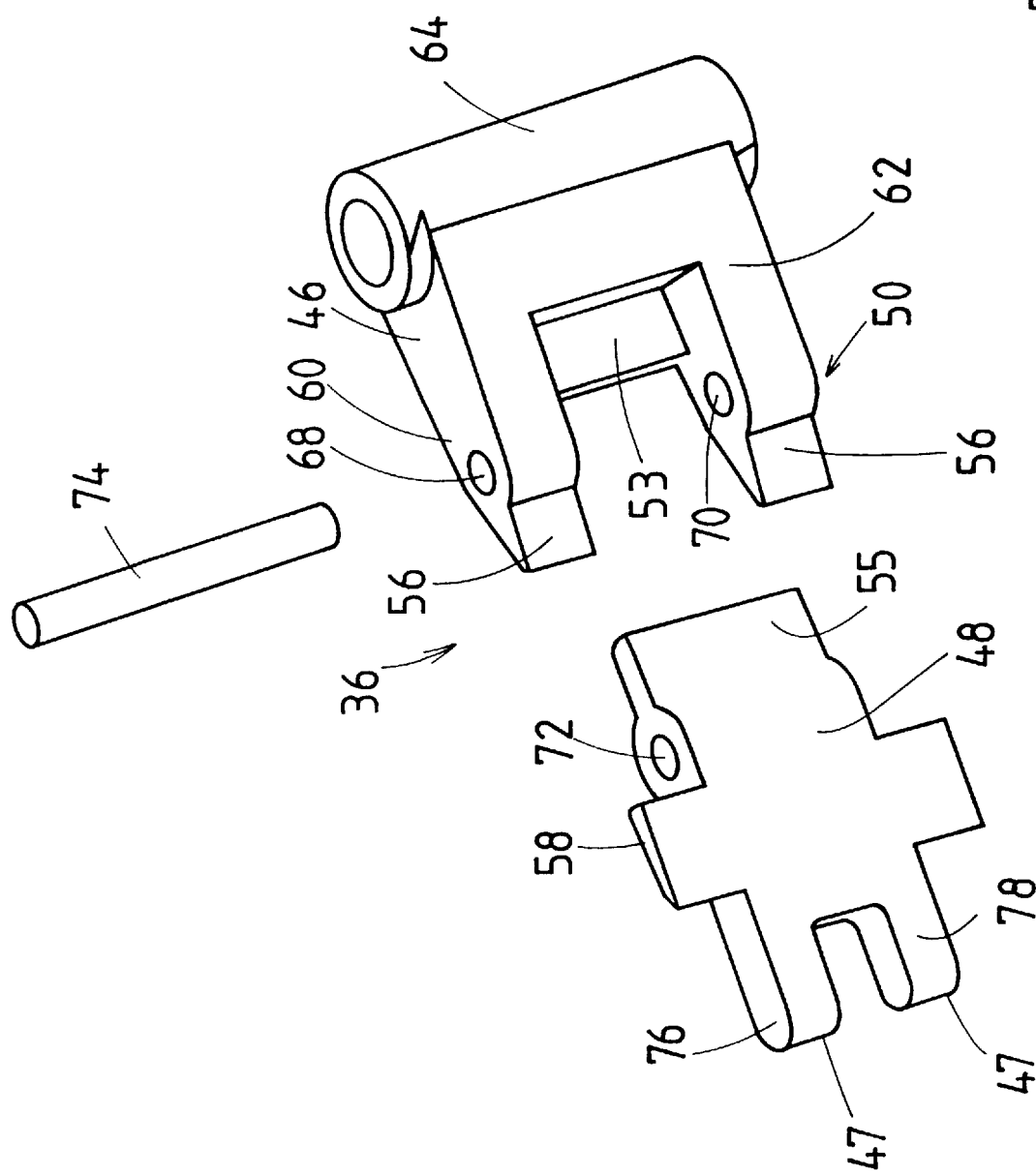
FIG. 4 is an exploded perspective illustration of the two-piece safety lever.

FIG. 4 is an exploded perspective illustration of the safety lever 36 and the two links 46 and 48.

As can be seen from FIG. 4, the link 46 consists of two parallel arms 60 and 62, which are interconnected by a bearing bush 64. The bearing bush 64 is connected to the pivot lever 40 and mounted together with this pivot lever 40 on a housing-fixed pin 66. A stop 53 extends between the arms 60 and 62. The joint 50 is formed by two aligned bearing bores 68 and 70 in the arms 60 and 62, respectively, by a bearing bore 72 in the link 48 and by a joint pin 74. The two-piece stop boss 56 is formed at the ends of the arms.

The link 48 has two arms 76 and 78 on its end located on the side of the locking lug. At their ends the arms 76 and 78 form the two-piece contact surface 47. The safety lever 36 engages, with this contact surface, the transverse portion 34 of the locking lug 30 in the position of FIG. 1. In the position of FIG. 3 the link 48 extends with the arms 76 and 78 around the central portion of the locking lug 30.

The arm 55 of the link 48 can also be seen in FIG. 4. This arm 55 extends between the two arms 60 and 62 of the link 46 and engages the stop 53 of the link 46 in the substantially straight end position of the links 46 and 48.

Instead of the illustrated and described link arrangement also other mechanism, which, for example, make use of an eccentric, can be used to obtain the same effect and to pull back the contact surface 46.

We claim:

1. A locking assembly in a launcher for missiles, comprising:

a pivotally mounted blocking latch which is provided with two blocking lugs for extending over a shoe provided on the missile;

a spring by which said blocking latch is biased toward a blocking position, in which the shoe of the missile is retained by said blocking lugs;

a locking lug provided on said blocking latch;

a safety lever having a contact surface which is engaged by said locking lug in said blocking position when inertial forces of the missile act on said blocking latch such that said blocking latch is retained in said blocking position, in which said blocking lugs extend over the shoe of the missile; and means for pivoting said safety lever about a pivot axis out of the pivotal path of said locking lug, which enables said blocking latch to pivot against the action of said spring into a release position, in which said blocking latch releases the shoe of the missile;

wherein said safety lever comprises means for reducing the distance between said contact surface and said pivot axis during the pivotal movement of said safety lever, such that said contact surface is removed from said locking lug during said pivotal movement.

2. The locking assembly of claim 1, wherein:

said safety lever comprises a first link and a second link;

said first link is located adjacent to said locking lug and comprises said contact surface;

said second link is located remote from said locking lug and is pivotally mounted about said pivot axis;

said first link and said second link are interconnected by a joint;

said safety lever, in an operating position, engages a structure-fixed stop which prevents said safety lever from being deflected in a first direction under the action of longitudinal forces, such that said safety lever acts as a rigid structure;

the deflecting movement of said links is limited to a finite angle in a second direction by stop means; and said means for pivoting said safety lever act on said second link.

* * * * *